United States Patent Office

2,861,863
Patented Nov. 25, 1958

2,861,863

IMPROVEMENT OF FASTNESS OF CELLULOSIC FIBERS WITH A POLYMERIZATION PRODUCT OF BASIC VINYL COMPOUNDS

Curt Schuster, Robert Gehm, and Julius Eisele, Ludwigshafen (Rhine), and Wilhelm Federkiel, Frankenthal, Germany, assignors to Badische Anilin- & Soda-Fabrik Aktiengesellschaft, Ludwigshafen (Rhine), Germany No Drawing. Application December 18, 1953
Serial No. 399,168

Claims priority, application Germany December 19, 1952

18 Claims. (Cl. 8—74)

This invention relates to the improvement of the fastness properties of dyed textile materials.

We have found that the fastness properties of dyeings, in particular the fastness to moisture, of dyeings, in particular dyeings with substantive dyestuffs, can be considerably improved by treating the dyeings with polymers containing basic groups and which are free from cyclic carbonyl groups, or their water-soluble salts or their quaternary ammonium compounds.

Suitable polymers of the said kind are for example the polymers of N-vinylimidazol and its derivatives, such as N-vinyl-2-methylimidazol, N-vinyl-2-phenylimidazol, N-vinyl - 2 - methylolimidazol, N - vinylbenzimidazol or 2 - vinylbenzimidazol, 2 - vinylpyridines, aminostyrenes, such as m-dimethylaminostyrene, and also the polymers obtainable from dimethylamino-hydroxyethylvinyl ether or also copolymers of the said substances with each other or with other polymerizable compounds not containing basic groups. They may be used in the form of true or colloidal solutions or as emulsions or suspensions. The water-soluble salts of the said polymers or copolymers or their quaternary ammonium compounds, which are also usually water-soluble, such as are obtained by treatment of the said polymers or copolymers with alkyl or aralkyl chlorides, mono- or di-alkyl sulfates or esters of sulfonic acids, are of special advantage.

We have also found that the action of the said polymers can be yet further increased and still faster dyeings can be obtained by also treating the dyeings with watersoluble salts of copper, cobalt or nickel, the said treatment being effected before or after the treatment with the polymers but preferably simultaneously therewith.

Suitable salts of copper, cobalt or nickel are for example their sulfates, chlorides or acetates or also the corresponding salts with aromatic hydroxycarboxylic acids.

The following examples will further illustrate this invention but the invention is not restricted to these examples.

*Example 1*

100 grams of a cotton fabric dyed with 3 grams of a trisazo dyestuff (prepared by coupling diazotized 2-aminonaphthalene - 4.8 - disulfonic acid with 1 - aminonaphthalene, diazotizing the resulting monoazo dyestuff and coupling with 1-aminonaphthalene-7-sulfonic acid, again diazotizing the resultant diazo dyestuff and coupling with 2-amino-5-hydroxynaphthalene sulfonic acid) are treated for about 20 minutes at about 25° C. in 4 litres of water containing 3 grams of the quaternary ammonium compound obtained from poly-N-vinylimidazol and p-toluene sulfonic acid isobutyl ester. After rinsing and drying there is obtained a deep blue dyed fabric the dyeing of which is distinguished by good fastness to moisture, while the fastness to light of the dyeing is not deleteriously affected by this treatment.

*Example 2*

100 grams of viscose staple fibre yarn dyed with 2 grams of copper phthalocyanine disulfonic acid are treated for 25 minutes at 25° to 30° C. in 2 litres of water containing 2 grams of the quaternary ammonium compound obtained from poly-N-vinylimidazol and dimethyl sulfate. After the usual finishing off, a turquoise blue dyed yarn of very good fastness to moisture and light is obtained.

*Example 3*

100 grams of a viscose rayon fabric dyed with 2 grams of an azo dyestuff (obtained from diazotized 1-o-toluenesulfonamino - 8 - hydroxy - 3.6 - disulfonic acid and 1 - methyl - 3 - amino - 4 - methoxybenzene, treatment of the resultant monoazo dyestuff with phosgene and splitting off of the o-toluenesulfonic acid group from the resulting urea) are treated for 20 minutes at 50° to 60° C. in 2 litres of water containing 4 grams of the quaternary ammonium compound obtainable from poly-2-vinylpyridine and p-toluene sulfonic acid methyl ester. After the usual finishing off, red dyeings with good fastness to light, water and perspiration are obtained.

*Example 4*

100 grams of a cotton skein are first dyed with 3 grams of a trisazo dyestuff (obtained by coupling diazotized 4 - amino - 1,3 - dimethylbenzene - 5 - sulfonic acid with 1-amino-2.5-dimethylbenzene, further coupling of the diazotized monoazo dyestuff with 1-amino-2-ethoxynaphthalene-6-sulfonic acid and further coupling of the diazotized disazo dyestuff with 1-acetylamino-8-hydroxynaphthalene - 3.6 - disulfonic acid) and the dyed skein is then treated for 20 minutes at 20° C. in 4 litres of water containing 4 grams of the quaternary ammonium compound obtainable from poly-N-vinyl-2-methylolimidazol and p-toluene sulfonic acid methyl ester. After finishing off in the usual way, a green dyed skein is obtained the dyeing of which has good fastness to moisture and very good fastness to light.

*Example 5*

100 grams of a cuprammonium rayon fabric are first dyed with 2 grams of a trisazo dyestuff (obtained by coupling diazotized 2-aminobenzene-5-sulfonic acid with 1-aminonaphthalene-7-sulfonic acid, further diazotization of the resultant monoazo dyestuff and coupling with 1-aminonaphthalene and further diazotization of the resultant disazo dyestuff and coupling with 2-phenylamino-5-hydroxynaphthalene-7-sulfonic acid) and then treated for 20 minutes at 30° C. in 2 litres of water containing 3 grams of the quaternary ammonium compound obtainable from poly-m-dimethylaminostyrene and p-toluene sulfonic acid methyl ester.

After the usual finishing off, deep blue dyeings with good fastness to light and good fastness to moisture are obtained.

*Example 6*

100 grams of a cotton fabric are first treated for an hour at about 90° C. in 5 litres of water containing 3 grams of a trisazo dyestuff (obtained from diazotized 1-aminobenzene-2.5-disulfonic acid and 1-aminonaphthalene-7-sulfonic acid, further diazotization of the resultant monoazo dyestuff and coupling with 1-aminonaphthalene, further diazotization of the resulting disazo dyestuff and coupling with 2-phenylamino-5-hydroxynaphthalene-7-sulfonic acid) and 20 grams of sodium sulfate. The dyed fabric is rinsed and treated for 20 minutes at 25° C. in 5 litres of water containing 4 grams of poly-N-vinylimidazol. After the usual finishing off, a blue dyed cotton fabric is obtained the dyeing of which has good fastness to moisture and very good fastness to light.

Example 7

100 grams of a viscose staple fibre skein dyed with 2 grams of tetraphenyl copper phthalocyanine carboxylic acid are treated for 30 minutes at 30° C. with a solution of 5 grams of the reaction product of poly-N-vinylimidazol and dimethylsulfate in 2 litres of water. A green dyeing which has good fastness to moisture and very good fastness to light is obtained.

Example 8

100 grams of viscose rayon fabric are first dyed in the usual way in 4 litres of water containing 5 grams of the disazo dyestuff (obtained from diazotized p-aminosalicylic acid and 1-aminonaphthalene, further diazotization of the resultant monoazo dyestuff and coupling with 2-amino-8-hydroxynaphthalene-6-sulfonic acid) and 15 grams of sodium sulfate, and then treated for 20 minutes at 30° C. with a solution of 8 grams of the reaction product of the copolymer of styrene and dimethylaminostyrene with dimethyl sulfate in 4 litres of water. After finishing off in the usual way, black dyeings of good fastness to light and moisture are obtained.

Example 9

100 grams of cotton fabric dyed with the trisazo dyestuff described in Example 1 are treated for 20 minutes at 25° C. in 4 litres of water containing 3 grams of the copolymer of N-vinylimidazol and maleic acid diethyl ester rendered quaternary with dimethyl sulfate. After rinsing and drying there is obtained a blue dyed fabric the dyeing of which is distinguished by good fastness to moisture. The fastness to light is not influenced by the aftertreatment.

Example 10

1000 grams of staple fibre yarn dyed with 20 grams of copper phthalocyanine disulfonic acid are treated for 30 minutes at 25° to 30° C. in 20 litres of water containing 30 grams of a copolymer of N-vinylimidazol and acrylonitrile rendered quaternary with dimethyl sulfate. After the usual finishing off, a turquoise blue dyeing with very good fastness to moisture and light is obtained.

Example 11

100 grams of cuprammonium rayon fabric are first dyed in the usual manner with 2 grams of the dyestuff described in Example 5 and then treated for 20 minutes at 25° to 30° C. in 3 litres of water containing a copolymer of N-vinylimidazol and styrene which has been rendered quaternary with dimethyl sulfate. After the usual finishing off, there are obtained deep blue dyeings with good fastness to moisture and light.

Example 12

100 grams of a cotton skein are first dyed with 3 grams of the trisazo dyestuff described in Example 4 and then treated for 20 minutes at 25° C. in 2 litres of water containing 3 grams of a copolymer of N-vinylimidazol and acrylamide which has been rendered quaternary with dimethyl sulfate. A green dyed skein is obtained the dyeing of which has good fastness to moisture and light.

Example 13

100 grams of a viscose rayon fabric are first dyed with 2 grams of the azo dyestuff specified in Example 3 and then treated for 15 minutes at 25° to 30° C. in 4 litres of water containing 3 grams of a copolymer of N-vinylimidazol and methyl acrylate which has been made quaternary with dimethyl sulfate. After the usual finishing off, red dyeings having good fastness to moisture and light are obtained.

Example 14

100 grams of a cotton fabric are dyed with 20 grams of copper phthalocyanine disulfonic acid and then treated for 20 minutes at 25° to 30° C. in 4 litres of water containing 30 grams of a copolymer of vinylimidazol and vinyl pyrrolidone which has been converted into the quaternary compound with dimethyl sulfate. The turquoise blue dyeings obtained have very good fastness to light and moisture.

Example 15

100 grams of a cotton fabric dyed with 3 grams of Immedial Yellow GG (Schultz Farbstofftabellen, 1931, 7th edition, No. 1068) are treated for 30 minutes at 25° C. in 2 litres of water containing 4 grams of poly-N-vinylimidazol rendered quaternary with dimethyl sulfate. After the usual finishing off, a yellow dyed cotton fabric having very good fastness properties is obtained.

Example 16

100 grams of a cotton fabric dyed with 3 grams of Benzo Fast Scarlet 4 BA (ibid., No. 306) are treated for 25 minutes at 25° to 30° C. in 4 litres of water containing 3 grams of the quaternary ammonium compound obtainable from poly-N-vinylimidazol and dimethyl sulfate and 2 grams of copper sulfate. After rinsing and drying a yellowish-brown dyed fabric is obtained which is distinguished by good fastness to moisture and light.

Example 17

100 grams of a viscous staple fibre yarn dyed with 2 grams of Benzo Brown MC (ibid., No. 412) are treated for 30 minutes at 20° to 30° C. in 2 litres of water containing 2 grams of a copolymer of N-vinylimidazol and maleic acid diethyl ester which has been made quaternary with dimethyl sulfate, and 1 gram of copper acetate. After finishing off in the usual way, a brown dyed staple fibre yarn is obtained having good fastness to light and good fastness to moisture.

Example 18

100 grams of a viscose rayon fabric dyed with 4 grams of Direct Deep Black EW extra (ibid., No. 671) are treated for 20 minutes at 30° C. in 2 litres of water containing 6 grams of a copolymer of N-vinylimidazol and acrylonitrile rendered quaternary with dimethyl sulfate, and 2 grams of copper chloride. After the usual finishing off, a reddish-black dyed viscose rayon fabric is obtained with good fastness properties.

Example 19

100 grams of a cotton skein dyed with 2 grams of Brilliant Benzo Blue 6B (ibid., No. 510) are treated for 30 minutes at 20° to 30° C. in 2 litres of water containing 2 grams of a copolymer of N-vinylimidazol and N-vinylpyrrolidone which has been made quaternary with dimethyl sulfate and 2 grams of copper acetate. After the usual finishing off, a blue-green dyed cotton skein with good fastness properties is obtained.

Example 20

100 grams of a cotton skein dyed with 2 grams of Brilliant Benzo Blue 6B (ibid., No. 510) are treated for 30 minutes at 25° C. in 2 litres of water containing 2 grams of poly-N-vinylimidazol rendered quaternary with dimethyl sulfate and 2 grams of cobalt sulfate. A blue dyed cotton skein with good fastness properties is obtained.

The same amount of nickel sulfate can be used instead of cobalt sulfate with the same result.

Example 21

100 grams of a cotton fabric dyed with 3 grams of Immedial Yellow GG (ibid., No. 1068) are treated for 30 minutes at 25° C. in 2 litres of water containing 4 grams of poly-N-vinylimidazol rendered quaternary with dimethyl sulfate and 2 grams of copper acetate. A yellow dyed cotton fabric with very good fastness properties is obtained.

We claim:
1. Materials of the class consisting of cellulose and regenerated cellulose fibers dyed with a substantive dyestuff having incorporated therein as a fastness improver a polyvinylimidazole.
2. Materials of the class consisting of cellulose and regenerated cellulose fibers dyed with a substantive dyestuff having incorporated therein as a fastness improver a poly-N-vinylimidazole.
3. Materials of the class consisting of cellulose and regenerated cellulose fibers dyed with a substantive dyestuff having incorporated therein as a fastness improver a copolymer obtained from N-vinylimidazole and a polymerizable compound selected from the class consisting of acrylonitrile, acrylamide, acrylic acid esters, maleic acid esters, and styrene.
4. A process for the improvement of the fastness properties, in particular the fastness to moist treatment of dyeings with substantive dyestuff on materials of the class consisting of cellulose and regenerated cellulose fibers which comprises treating such dyeings with the aqueous solution of a polymerization product of a basic vinyl compound from the class consisting of vinyl imidazoles and vinyl pyridines.
5. A process as claimed in claim 4, wherein the treatment is effected with an aqueous colloidal solution of the said polymerization products.
6. A process as claimed in claim 4, wherein the treatment is effected with an aqueous solution of a quaternary ammonium compound of the said polymerization products, the quaternizing compound being selected from the class consisting of alkyl chlorides, aralkyl chlorides, monoalkyl sulfates, dialkyl sulfates and esters of sulfonic acids.
7. A process as claimed in claim 6 wherein the polymerization product used had been quaternized with para-toluene sulfonic acid methyl ester.
8. A process as claimed in claim 6 wherein the polymerization product used had been quaternized with dimethyl sulfate.
9. A process as claimed in claim 4 wherein the dyeings are treated with an aqueous solution of poly-N-vinyl imidazole.
10. A process as claimed in claim 6 wherein the dyeings are treated with an aqueous solution of a quaternized poly-N-vinyl imidazole.
11. A process as claimed in claim 10 wherein the dyeings are treated with an aqueous solution of a quaternized poly-N-vinyl-2-methylol imidazole.
12. A process as claimed in claim 10 wherein the dyeings are treated with an aqueous solution of polyvinyl pyridine.
13. A process as claimed in claim 10 wherein the dyeings are treated with an aqueous solution of a quaternized polyvinyl pyridine.
14. A process is claimed in claim 4 wherein the dyeings are treated with an aqueous solution of a copolymer obtained from two different basic vinyl compounds of the class consisting of vinyl imidazoles and vinyl pyridine.
15. A process as claimed in claim 4 wherein the dyeings are treated with an aqueous solution of a copolymer of a basic vinyl compound from the class consisting of vinyl imidazoles and vinyl pyridines and a vinyl compound selected from the class consisting of acrylonitrile, acrylamide, acrylic acid esters, maleic acid esters and styrene.
16. A process as claimed in claim 4 wherein the treatment is effected in the presence of a water-soluble salt of a metal selected from the class consisting of copper, cobalt and nickel.
17. Textiles of the class consisting of cellulose and regenerated cellulose material dyed with a substantive dyestuff having incorporated therein a fastness improver selected from the class consisting of a polymerization product of a basic vinyl compound from the class consisting of vinyl imidazoles and vinyl pyridines.
18. Textiles of the class consisting of cellulose and regenerated cellulose material dyed with a substantive dyestuff having incorporated therein a fastness improver selected from the class consisting of a co-polymerization product of a basic vinyl compound of the class consisting of vinyl imidazole and vinyl pyridines and a vinyl compound selected from the class consisting of acrylonitrile, acrylamide, acrylic acid ester, maleic acid esters and styrene.

References Cited in the file of this patent

UNITED STATES PATENTS

| | | |
|---|---|---|
| 2,004,476 | Barz | June 11, 1935 |
| 2,138,113 | Munz | Nov. 29, 1938 |
| 2,180,809 | Kartaschoff | Nov. 21, 1939 |
| 2,328,900 | Grimm | Sept. 7, 1943 |
| 2,364,725 | Landolt | Dec. 12, 1944 |
| 2,484,420 | Minsk | Oct. 11, 1949 |
| 2,527,863 | Webb | Oct. 31, 1950 |
| 2,548,564 | Sprague | Apr. 10, 1951 |
| 2,603,621 | Craig | July 15, 1952 |
| 2,643,990 | Ham | June 30, 1953 |
| 2,649,354 | Hemmi | Aug. 18, 1953 |

OTHER REFERENCES

Textile Research Journal Abstracts for May 1951, p. A223.